United States Patent
Wen

(10) Patent No.: US 10,639,834 B2
(45) Date of Patent: May 5, 2020

(54) INJECTION MOLDING MACHINE

(71) Applicant: Kuo Yi Iron Works Co., Ltd., Taichung (TW)

(72) Inventor: Hsiu-Feng Wen, Taichung (TW)

(73) Assignee: KUO YI IRON WORKS CO., LTD., Taichung (TW)

( * ) Notice: Subject to any disclaimer, the term of this patent is extended or adjusted under 35 U.S.C. 154(b) by 483 days.

(21) Appl. No.: 15/493,658

(22) Filed: Apr. 21, 2017

(65) Prior Publication Data
US 2018/0178428 A1   Jun. 28, 2018

(30) Foreign Application Priority Data

Dec. 22, 2016   (TW) .............................. 105142710 A

(51) Int. Cl.
| | |
|---|---|
| *B29C 45/76* | (2006.01) |
| *B29C 45/73* | (2006.01) |
| *B29C 45/04* | (2006.01) |
| B29C 45/64 | (2006.01) |
| B29K 67/00 | (2006.01) |

(52) U.S. Cl.
CPC .......... *B29C 45/73* (2013.01); *B29C 45/0408* (2013.01); *B29C 45/64* (2013.01); *B29K 2067/046* (2013.01); *B29K 2995/0056* (2013.01)

(58) Field of Classification Search
CPC ............ B29C 45/7331; B29C 45/7337; B29C 45/03–04; B29C 45/07

USPC ................................................. 425/588, 589
See application file for complete search history.

(56) References Cited

U.S. PATENT DOCUMENTS

| | | | | |
|---|---|---|---|---|
| 3,373,460 A | * | 3/1968 | Ladney, Jr. ............. | B29C 33/48 425/416 |
| 5,075,051 A | * | 12/1991 | Ito ....................... | B29C 45/0433 425/575 |
| 5,855,935 A | * | 1/1999 | Brent ...................... | B29C 45/06 425/574 |
| 7,473,091 B2 | * | 1/2009 | Woo ...................... | C03B 11/005 425/406 |
| 7,985,360 B2 | * | 7/2011 | Morooka ................ | B29C 33/02 425/453 |

* cited by examiner

*Primary Examiner* — Joseph S Del Sole
*Assistant Examiner* — Thu Khanh T Nguyen
(74) *Attorney, Agent, or Firm* — Hamre, Schumann, Mueller & Larson, P.C.

(57) ABSTRACT

An injection molding machine includes at least one machine platform, an injection device, at least one heating unit, at least one cooling unit, and at least one push-pull device. The injection device is configured to inject materials into at least one mold. The at least one heating unit is configured to heat the at least one mold. The at least one cooling unit is configured to cool the at least one mold. The push-pull drive member is configured to drive the at least one mold to move between a first position, in which the at least one mold corresponds to the injection device and the at least one heating unit, and a second position, in which the at least one mold corresponds to the at least one cooling unit.

2 Claims, 9 Drawing Sheets

INJECTION MOLDING MACHINE

CROSS-REFERENCE TO RELATED APPLICATION

This application claims priority of Taiwanese Patent Application No. 105142710, filed on Dec. 22, 2016.

FIELD

The disclosure relates to a molding machine, more particularly to an injection molding machine for bioplastics.

BACKGROUND

In response to the environmental protection requirements, bioplastics are increasingly adopted. Bioplastics are plastics made from natural materials, such as starches of corn, sugar beet, wheat, sweet potato, etc., or sugar, which are fermented, dehydrated and polymerized to make into polymers. Because the polylactic acid (PLA) in the natural materials is degradable under certain conditions, harm to the environment can be avoided. Further, by using the injection molding machine, tablewares, such as plates, cups, bowls, knives, forks, etc., made from bioplastics can be mass produced. However, the existing injection molding machine used for making a product from the bioplastics has the disadvantages of slow crystallization rate and low production efficiency.

To solve the aforesaid problems, a conventional bioplastic injection molding mechanism has been proposed, which is disclosed in Taiwanese Patent No. I403405. The bioplastic injection molding mechanism includes an injection molding machine, a liquid temperature circulation mechanism and an electromechanical control interface electrically connecting the injection molding machine and the liquid temperature circulation mechanism. The injection molding machine has a machine platform provided with a fixed mold seat, a movable mold seat, a toggle mechanism to drive the movable mold seat toward and away from the fixed mold seat, and a pushing mechanism. A mold has a female mold fixed to the fixed mold seat, and a male mold fixed to the movable mold seat. The liquid temperature circulation mechanism is connected to the male and female molds, and has a cold source device and a heat source device.

Although the aforesaid conventional bioplastic injection molding mechanism can achieve its intended purpose, after injection of materials into the mold, the cold source device must first be activated to cool the mold. After the temperature of the mold drops to a predetermined value, the heat source device is then activated to heat the mold. That is, the aforesaid single mold is repeatedly cooled and heated on the same workstation. As such, not only is the operation time long, but also the energy is wasted due to cooling of the mold by the cold source device and then heating of the mold by the heat source device.

SUMMARY

Therefore, an object of the present disclosure is to provide an injection molding machine that can permit cooling and heating of a mold at different positions after injection of materials into the mold so as to save operation time and energy.

Accordingly, an injection molding machine of this disclosure is configured to perform injecting, cooling and heat setting operations on at least one mold, and includes at least one machine platform, an injection device, at least one heating unit, at least one cooling unit, and at least one push-pull device. The at least one machine platform extends along a first axial direction and includes a base seat, a lift drive member mounted on the base seat, and a lower mold seat drivable by the lift drive member to move up and down relative to the base seat. The injection device extends along a second axial direction transverse to the first axial direction, is configured to inject materials into the at least one mold, and has an injection mouth.

The at least one heating unit is configured to heat the at least one mold and includes a lower heating plate mounted on the lower mold seat, and an upper heating plate disposed above the lower heating plate and positionable relative to the at least one machine platform. The upper heating plate has a passage hole for passage of the injection mouth therethrough. The at least one cooling unit is mounted on the lower mold seat and is configured to cool the at least one mold. The at least one cooling unit includes a lower cooling plate, an upper cooling plate disposed above the lower cooling plate, and a cooling drive member for driving the lower and upper cooling plates to move toward and away from each other along the second axial direction. The lower cooling plate is disposed on one side of the lower heating plate along a third axial direction transverse to the first and second axial directions.

The at least one push-pull device is mounted on the lower mold seat and is opposite to the at least one cooling unit. The at least one push-pull device includes a connecting member configured to be connected to the at least one mold, and a push-pull drive member connected to the connecting member. The push-pull drive member is configured to drive the at least one mold to move between a first position, in which the at least one mold corresponds to the injection device and the at least one heating unit, and a second position, in which the at least one mold corresponds to the at least one cooling unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
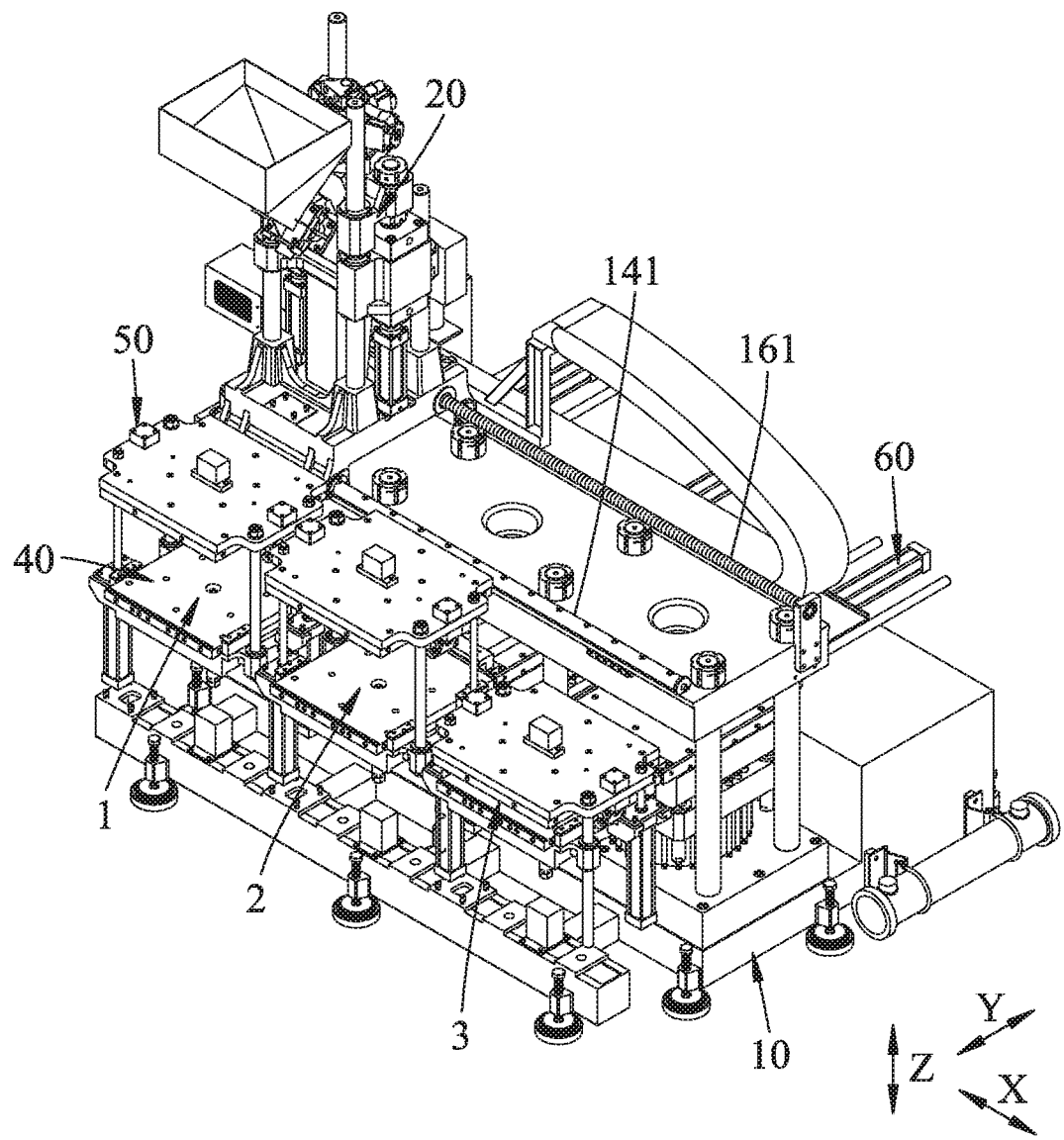
FIG. 1 is a perspective view of an injection molding machine according to the embodiment of the present disclosure.
Figure 2:
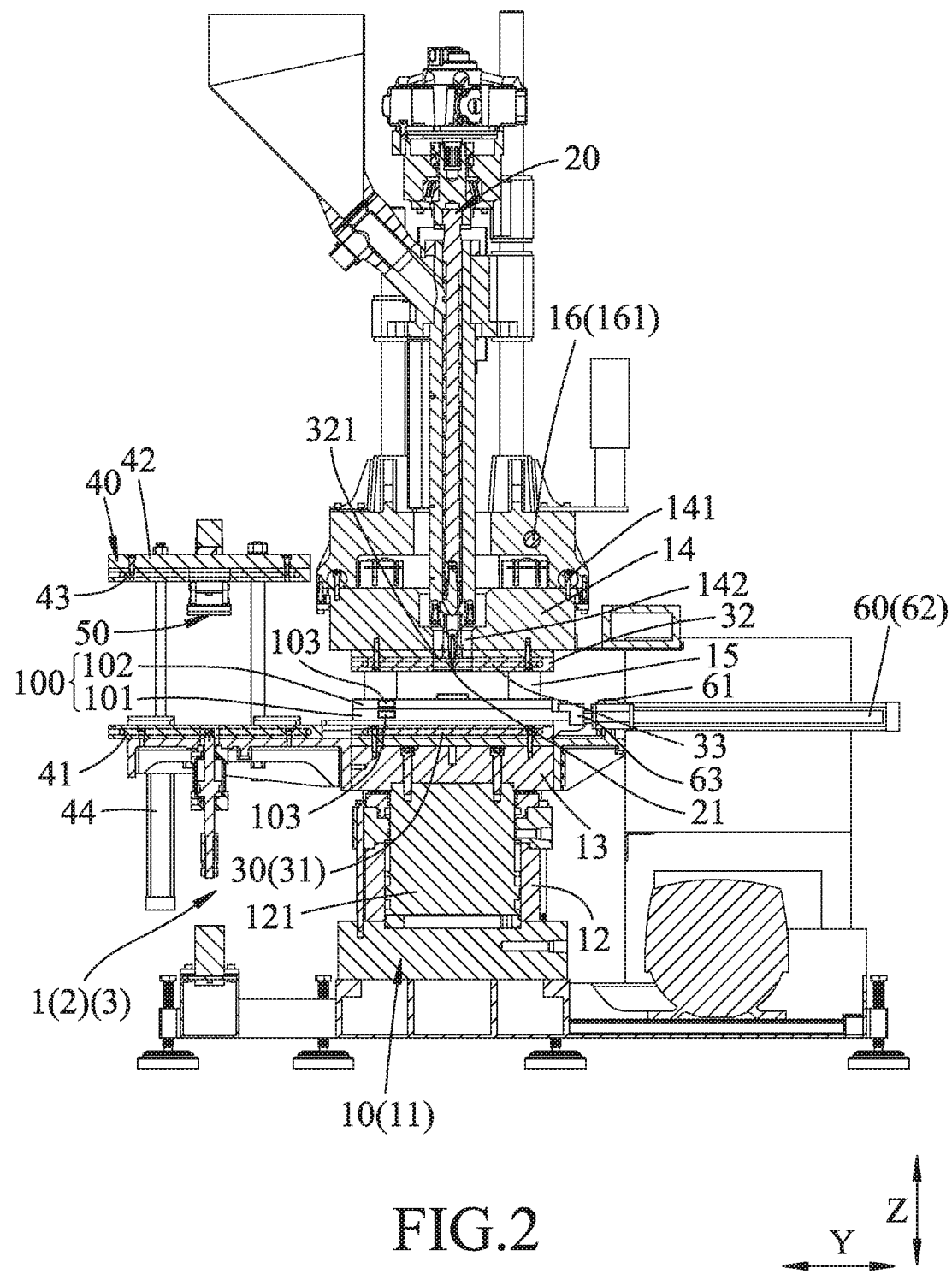
FIG. 2 is a sectional view of the embodiment, illustrating a mold located in a first position.

Referring to FIGS. 1 and 2, an injection molding machine according to the embodiment of the present disclosure is configured to perform injecting, cooling and heat setting operations on at least one mold 100, and includes at least one machine platform 10 extending along a first axial direction (X), an injection device 20, at least one heating unit 30, at least one cooling unit 40, at least one mold opening unit 50 and at least one push-pull device 60. The mold 100 includes a lower mold part 101 and an upper mold part 102 for covering the lower mold part 101. Each of the upper and lower mold parts 102, 101 has a temperature sensor switch 103 disposed inside thereof. The upper mold part 102 has a width extending along the first axial direction (X) larger than that of the lower mold part 101.

The injection molding machine of this disclosure is provided with three workstations 1, 2, 3 spaced apart from each other along the first axial direction (X), and uses only one injection device 20 that is movable among the workstations 1, 2, 3. Each workstation 1, 2, 3 has a machine platform 10, a heating unit 30, a cooling unit 40, a mold opening unit 50 and a push-pull device 60. To make this specification concise, only one workstation will be described hereinafter with reference to FIGS. 1 to 8.

The machine platform 10 extends along the first axial direction (X), and includes a base seat 11, a lift drive member 12 mounted on the base seat 11 and configured as a pressure cylinder, a lower mold seat 13 mounted on the lift drive member 12 and drivable by a piston 121 thereof to move up and down relative to the base seat 11, an upper mold seat 14 disposed above the lower mold seat 13, and a plurality of support posts 15 connected between the upper and lower mold seats 14, 13. The upper mold seat 14 has a through hole 142.

The injection device 20 is mounted on the upper mold seat 14, and extends along a second axial direction (Z) transverse to the first axial direction (X). The injection device 20 is configured to inject materials into the mold 100, and has an injection mouth 21 facing the lower mold seat 13.

The heating unit 30 is configured to heat the mold 100, and includes a lower heating plate 31 mounted on the lower mold seat 13, and an upper heating plate 32 disposed above the lower heating plate 31. The upper heating plate 32 is fixed to a bottom portion of the upper mold seat 14, and has a passage hole 321 for passage of the injection mouth 21 therethrough and corresponding to the through hole 142.

The cooling unit 40 is mounted on the lower mold seat 13, is configured to cool the mold 100, and includes a lower cooling plate 41 disposed on one side of the lower heating plate 31 along a third axial direction (Y) transverse to the first and second axial directions (X, Z), a positioning plate 42 disposed above the lower cooling plate 41, an upper cooling plate 43 fixed to a bottom portion of the positioning plate 42, and a pair of cooling drive members 44 (only one is shown in FIG. 2). The positioning plate 42 and the upper cooling plate 43 are driven to move toward and away from the lower cooling plate 41 along the second axial direction (Z) when the cooling drive members 44 are activated. Each cooling drive member 44 is a pressure cylinder.

Figure 9:
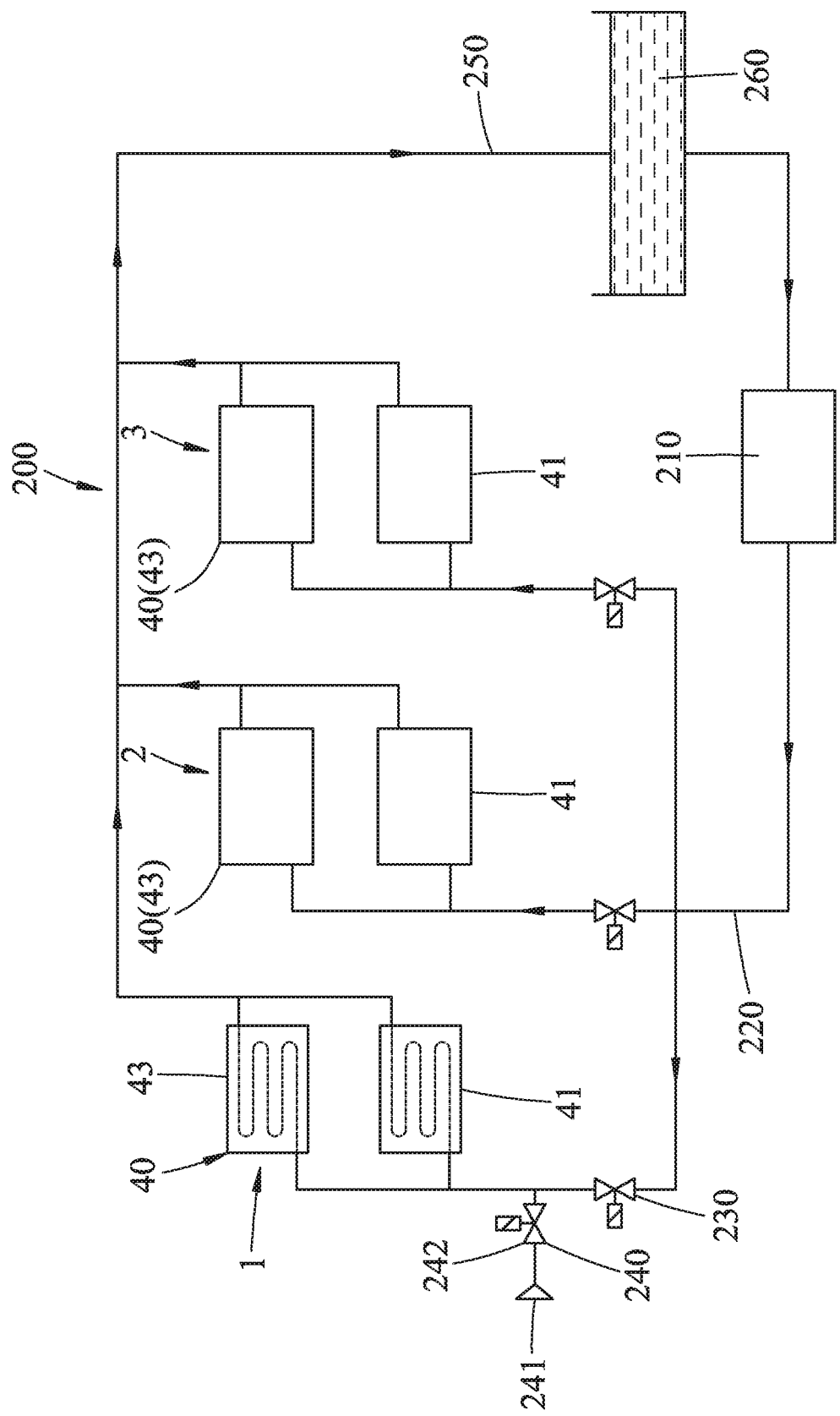
FIG. 9 is a diagram of a cooling water circulation system of the embodiment.

Referring to FIG. 9, the cooling unit 40 cooperates with a cooling water circulation system 200 which includes a water chiller 210, a water inlet pipe 220 connected to an outlet of the water chiller 210 and the lower and upper cooling plates 41, 43, an automatic control valve 230 mounted on the water inlet pipe 220, a drive group 240 mounted on the water inlet pipe 220 between the automatic control valve 230 and the lower and upper cooling plates 41, 43, a recycling pipe 250 connected to the lower and upper cooling plates 41, 43 and an inlet of the water chiller 210, and a water tank 260 mounted on the recycling pipe 250. The drive group 240 includes an air pressure source 241 and an automatic control valve 242.

Figure 5:
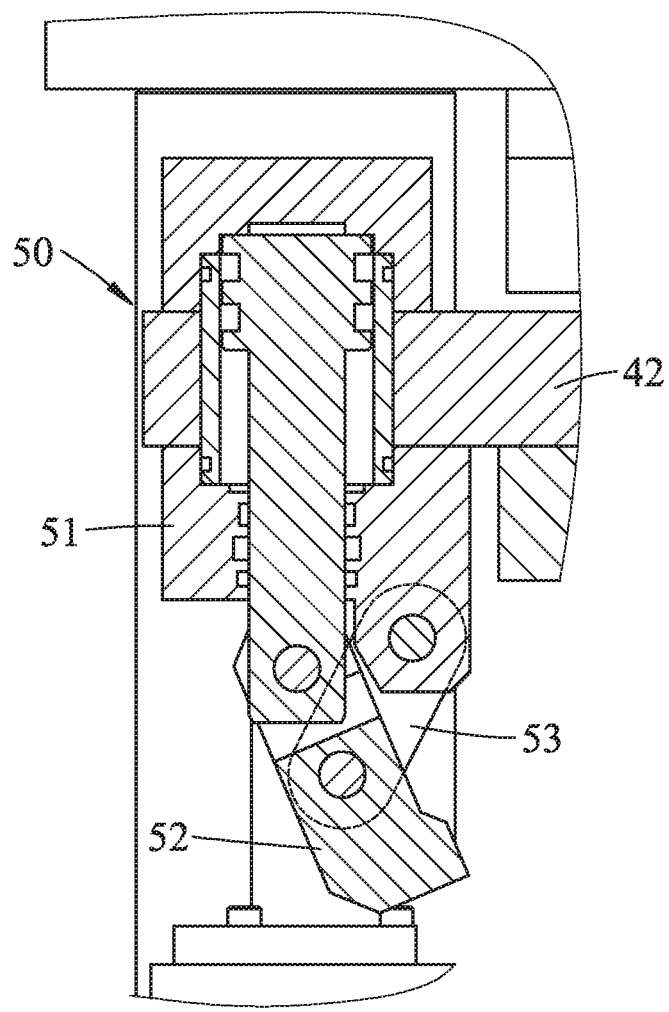
FIG. 5 is a sectional view taken along line V-V of FIG. 4.

With reference to FIG. 5, the mold opening unit 50 includes a pair of mold opening drive members 51 (only one is shown) respectively mounted on two opposite sides of the positioning plate 42, a pair of engaging members 52 (only one is shown) respectively drivable by the mold opening drive members 51, and a pair of connecting rods 53 (only one is shown) each of which is pivotally connected between the positioning plate 42 and a corresponding one of the engaging members 52. The pair of engaging members 52 are configured to engage and disengage with two opposite sides of the upper mold part 102 when the mold opening drive members 51 are activated. The mold opening drive members 51 are pressure cylinders.

The push-pull device 60 is mounted on the lower mold seat 13 and is disposed on the other side of the lower heating plate 31 opposite to the lower cooling plate 41. The push-pull device 60 includes a fixed seat 61 fixed to the lower mold seat 13, a push-pull drive member 62 mounted on the fixed seat 61, and a connecting member 63 connected between the push-pull drive member 62 and the mold 100. The push-pull drive member 62 is a pressure cylinder. When the push-pull drive member 62 is activated, it can drive the mold 100 to move between a first position, in which the mold 100 corresponds to the injection device 20 and the heating unit 30, and a second position, in which the mold 100 corresponds to the cooling unit 40. The control of the movement of the push-pull drive member 62 is accomplished through the use of two microswitches (not shown) mounted on the lower mold seat 13.

As shown in FIG. 2, prior to the start of the injection operation, the lift drive member 12 drives the lower mold seat 13 to a downward position, and the mold 100 is located at the first position which corresponds to the injection device 20 and the heating unit 30 and which is distal from the injection mouth 21. In the description below, the actions shown in FIGS. 3 to 8 are controlled by automation.

Figure 3:
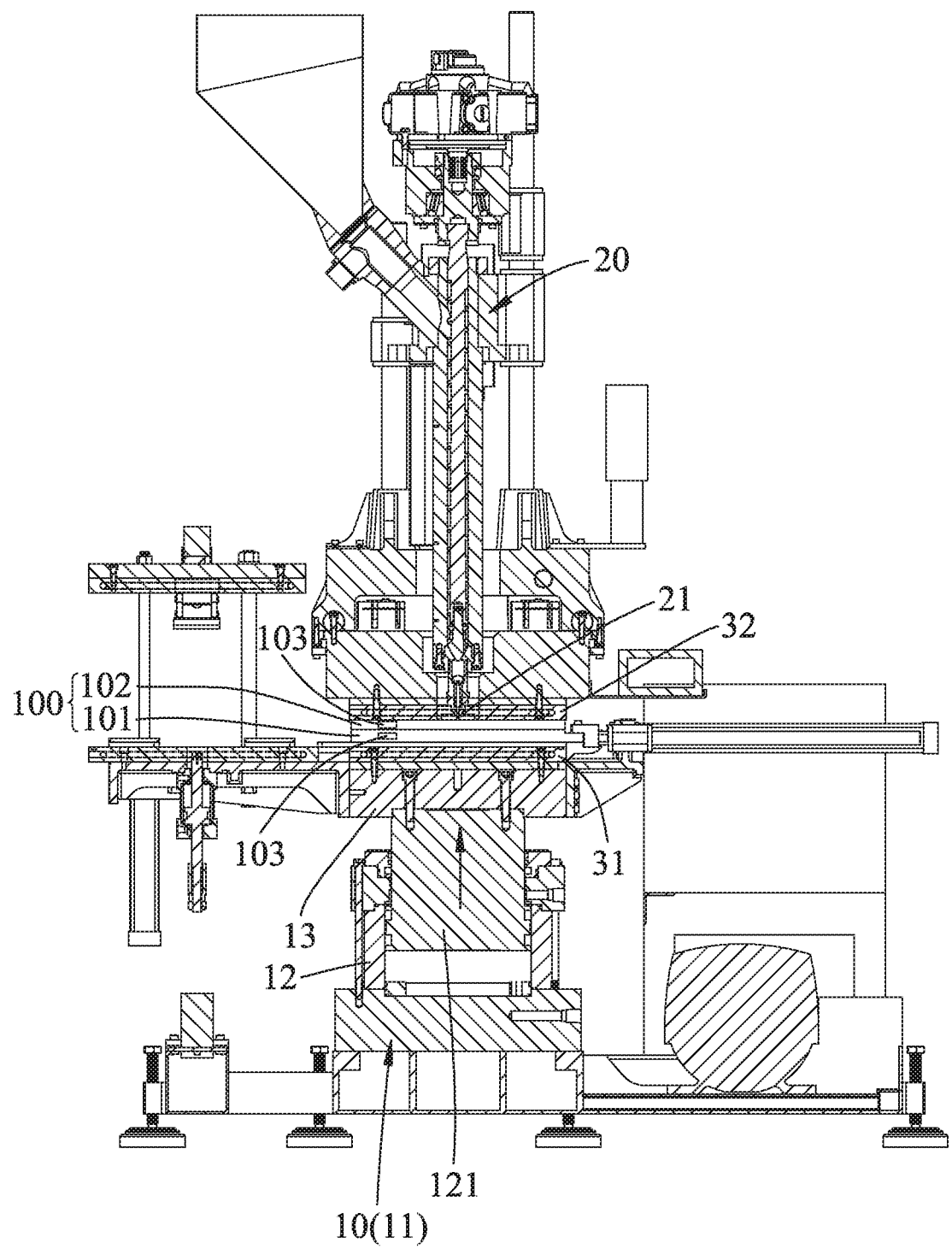
FIG. 3 is a view similar to FIG. 2, but illustrating a lift drive member driving a lower mold seat to move the mold upward relative to a base seat.

With reference to FIG. 3, when the injection molding machine of this disclosure is activated, the piston 121 of the lift drive member 12 pushes the lower mold seat 13 to move from the downward position to an upward position until the upper mold part 102 of the mold 100 abuts against a bottom portion of the upper heating plate 32 and the injection mouth 21. The heating unit 30 is then activated to preheat the mold 100. When the temperature of the mold 100 has reached an injection temperature as detected by the temperature sensor switches 103 of the upper and lower mold parts 102, 101, the injection device 20 is controlled by a program to start injecting materials into the mold 100. After the material injection, the lift drive member 12 is activated again to drive the lower mold seat 13 to move back to the downward position, as shown in FIG. 2.

Figure 4:
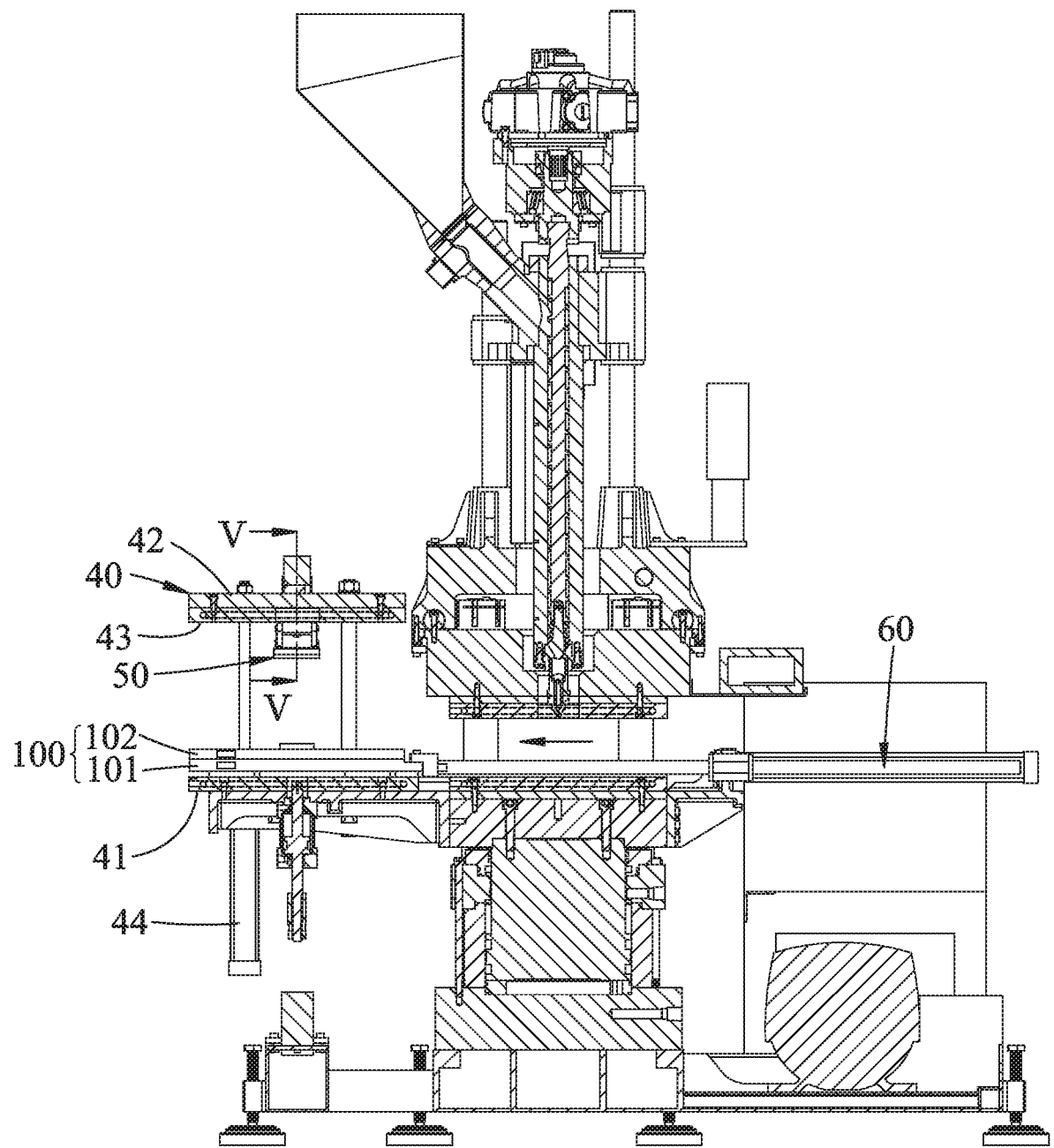
FIG. 4 is a view similar to FIG. 2, but illustrating a push-pull device driving the mold to move from the first position to a second position.

Next, as shown in FIG. 4, the push-pull drive member 62 is activated to drive the mold 100 to move from the first position to the second position which corresponds to the cooling unit 40. At this time, as shown in FIG. 5, the mold opening drive members 51 are not yet activated, and the engaging members 52 are distal from each other.

Figure 6:
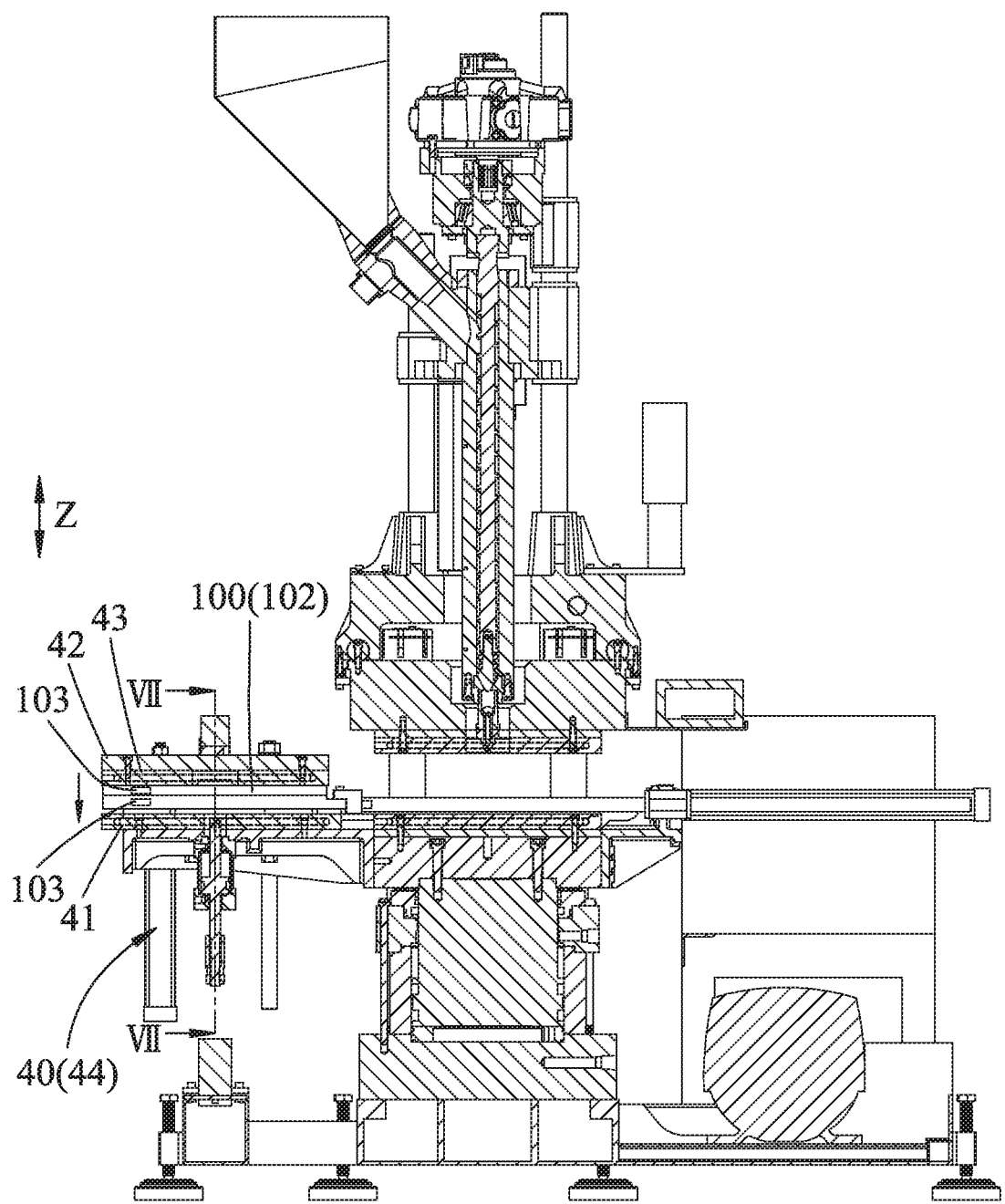
FIG. 6 is a view similar to FIG. 2, but illustrating the mold being cooled by a cooling unit.
Figure 7:
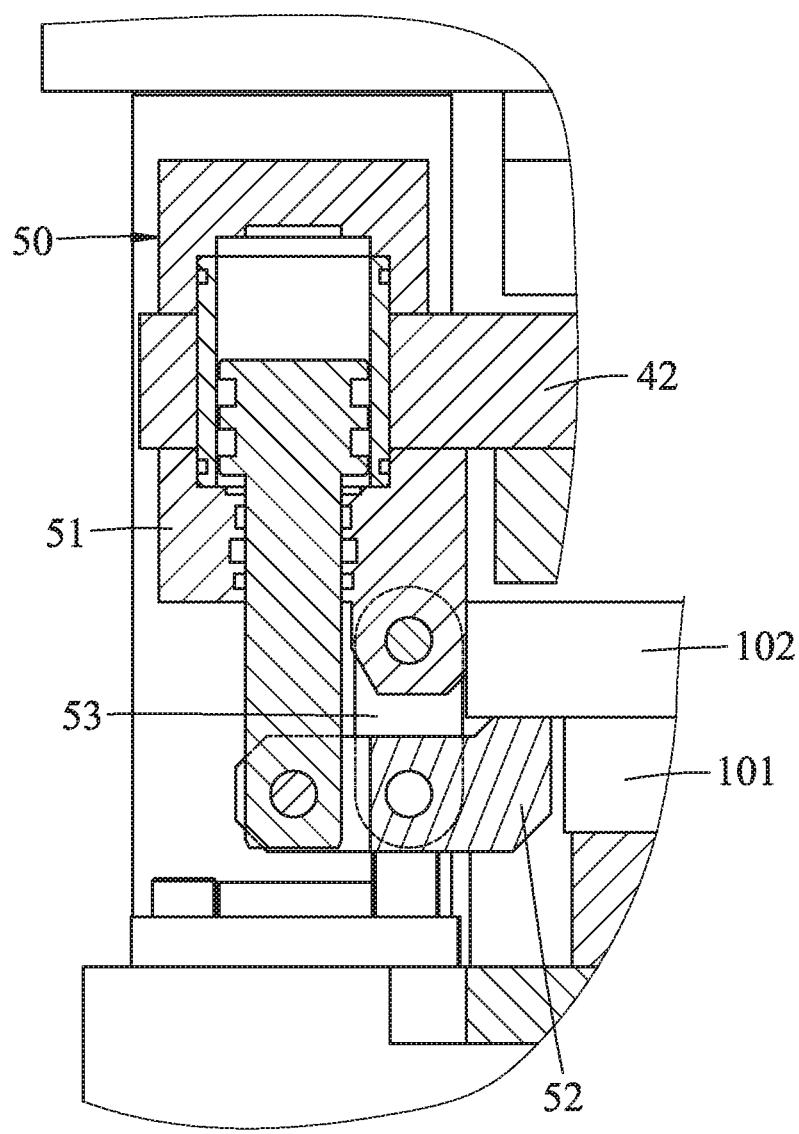
FIG. 7 is a sectional view taken along line VII-VII of FIG. 6.

As shown in FIG. 6, the cooling drive member 44 is then activated to drive the positioning plate 42 and the upper cooling plate 43 to move close to the lower cooling plate 41 along the second axial direction (Z) until the upper cooling plate 43 abuts against the upper mold part 102.

As shown in FIG. 9, the automatic control valve 230 is then activated, and cold water produced by the water chiller 210 flows into inner portions of the lower and upper cooling plates 41, 43 through the water inlet pipe 220 so as to cool the mold 100 and a finished product (not shown) inside the mold 100. After absorbing the heat from the mold 100, the water flows back to the water tank 260 through the recycling pipe 250 so as to be recycled for reuse.

When the temperature inside the mold 100 is detected by the temperature sensor switches 103 of the upper and lower mold parts 102, 101 to have decreased to a predetermined value (A), the temperature sensor switches 103 will send out control signals for controlling the cooling drive member 44 to drive the positioning plate 42 and the upper cooling plate 43 to move away from the lower cooling plate 41 and the mold 100 (see FIG. 4). The push-pull drive member 62 is then activated to drive the mold 100 to move from the second position to the first position (see FIG. 2). The lift drive member 12 is again activated to move the lower mold seat 13 and the mold 100 to the upper position (see FIG. 3). At this time, the finished product inside the mold 100 is heated by the lower and upper heating plates 31, 32 and is set to shape. When the temperature inside the mold 100 is detected by the temperature sensor switches 103 to have increased to a predetermined value (B), the temperature sensor switches 103 will send out control signals for controlling the lift drive member 12 to drive the lower mold seat 13 and the mold 100 to move to the downward position.

Figure 8:
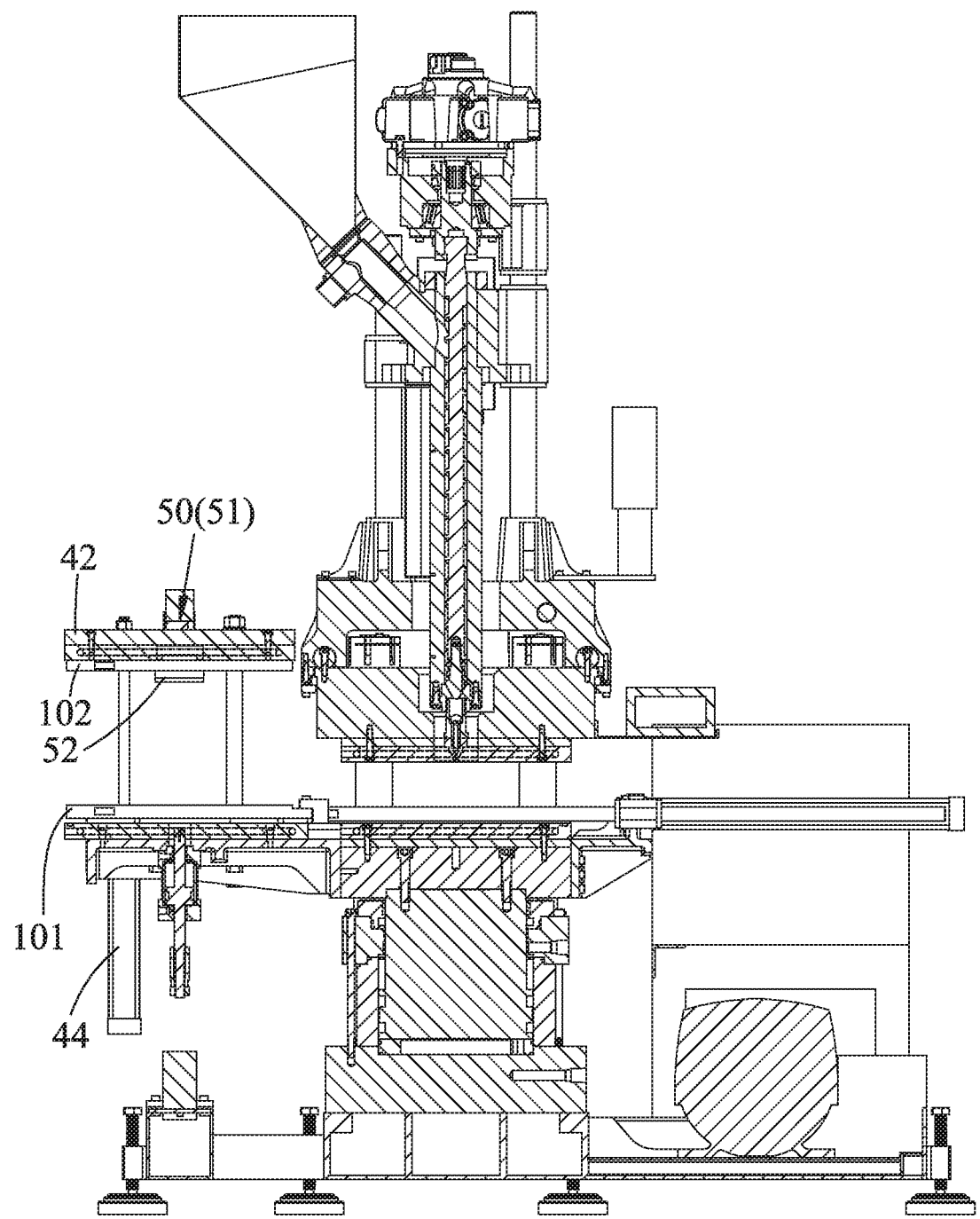
FIG. 8 is a view similar to FIG. 6, but illustrating upper and lower mold parts of the mold being separated from each other.

By repeating the operations shown in FIGS. 4 and 6, the mold 100 can be moved again to the second position, and the cooling drive member 44 can be activated to drive the positioning plate 42 to move downward. Afterwards, the mold opening drive members 51 of the mold opening unit 50 are activated, and the engaging members 52 are driven to move toward each other so as to respectively engage the two sides of the upper mold part 102. As shown in FIG. 8, the cooling drive member 44 is again activated to drive the positioning plate 42 to move upward, and because the upper mold part 102 is engaged with the engaging members 52, the upper mold part 102 will move upward along with the positioning plate 42, thereby opening the mold 100 to permit removal of the finished product from the mold 100.

After the finished product is removed from the mold 100, the cooling drive member 44 is again activated to drive the positioning plate 42 to move downward, so that the upper mold part 102 covers the lower mold part 101. The mold opening drive members 51 are then activated to release engagement of the engaging members 52 from the two opposite sides of the upper mold part 102. The operations shown in FIGS. 4 and 2 are then performed in sequence so as to move the empty mold 100 back to the first position in preparation for the next injection operation.

In the mold opening state, as shown in FIG. 8, in combination with FIG. 9, the automatic control valve 230 is closed, while the air pressure source 241 and the automatic control valve 242 of the drive group 240 are opened. High pressure air generated by the air pressure source 241 is used to drive water in the lower and upper cooling plates 41, 43 to the recycling pipe 250 in preparation for the next cooling operation.

It should be noted herein that the upper mold seats 14 of the machine platforms 10 of the three workstations 1, 2, 3 are integrally connected as one piece. The injection molding machine of this disclosure further comprises an injection drive unit 16 (see FIG. 2), and a pair of spaced-apart guide rails 141 (see FIG. 2) disposed on the upper mold seats 14 of the machine platforms 10 and extending along the first axial direction (X). The injection drive unit 16 is configured to drive movement of the injection device 20 along the first axial direction (X), and includes a servo motor (not shown) and a lead screw 161 (see FIGS. 1 and 2). The lead screw 161 is disposed on the upper mold seats 14, and extends in a direction parallel to the guide rails 141. In this embodiment, the injection device 20 is slidably disposed on the guide rails 141, and is drivable by the injection drive unit 16 to move along the guide rails 141 to the upper mold seat 14 of a selected one of the machine platforms 10.

In sum, through the cooperation of the components of this disclosure, the mold 100 can be sequentially subjected to such operations as injecting, cooling, heat setting and automatic mold opening, so that the operation time and energy can be saved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An injection molding machine configured to perform injecting, cooling and heat setting operations on at least three molds, said injection molding machine comprising:
   three work stations spaced apart from each other along a first axial direction, each of said work stations including:
      a machine platform extending along the first axial direction and including a base seat, a lift drive member mounted on said base seat, a lower mold seat drivable by said lift drive member to move up and down relative to said base seat, and an upper mold seat disposed above said lower mold seat,
      a heating unit configured to heat a respective one of the molds and including a lower heating plate mounted on said lower mold seat, and an upper heating plate disposed above said lower heating plate and positionable relative to said machine platform, said upper heating plate being fixed to said upper mold seat and having a passage hole,
      a cooling unit mounted on said lower mold seat and configured to cool the respective one of the molds, said cooling unit including a lower cooling plate, an upper cooling plate disposed above said lower cooling plate, and a cooling drive member for driving said lower and upper cooling plates to move toward and away from each other along a second axial direction transverse to the first axial direction, said lower cooling plate being disposed on one side of said lower heating plate along a third axial direction transverse to the first and second axial directions, and
      a push-pull device mounted on said lower mold seat and opposite to said cooling unit, said push-pull device including a connecting member configured to be connected to the respective one of the molds, and a push-pull drive member connected to said connecting member, said push-pull drive member being configured to drive the respective one of the molds to move between a first position, in which the respective one of the molds corresponds to an injection device and said heating unit, and a second position, in which the respective one of the molds corresponds to said cooling unit;
   the injection device movable among the three work stations and extending along the second axial direction, said injection device being configured to inject materials into a corresponding one of the molds and being mountable on said upper mold seat of said machine platform of a corresponding one of said work stations, the injection device having an injection mouth that is passable through said passage hole in said upper heating plate of said heating unit of the corresponding one of said work stations; and an injection drive unit for driving said injection device to move to said upper mold seat of said machine platform of a selected one of said work stations along the first axial direction.

2. The injection molding machine as claimed in claim 1, wherein each of the molds includes a lower mold part and an upper mold part for covering the lower mold part, said cooling unit of each of said work stations further including a positioning plate, and in each of said work stations, said upper cooling plate being fixed to said positioning plate, and each of said work stations including an mold opening unit, said mold opening unit including a pair of mold opening drive members mounted on said positioning plate, a pair of engaging members drivable by said pair of mold opening drive members, and a pair of connecting rods each of which is pivotally connected between said positioning plate and a corresponding one of said engaging members, said pair of engaging members being configured to engage and disengage with the upper mold part of a corresponding one of the molds when said pair of mold opening drive members are activated, said positioning plate being configured to move the upper mold part away from the lower mold part when said cooling drive member is activated.

\* \* \* \* \*